(12) United States Patent
Zhang et al.

(10) Patent No.: US 8,434,311 B2
(45) Date of Patent: May 7, 2013

(54) SYSTEM FOR CONTROLLING A COMBUSTION PROCESS FOR A GAS TURBINE

(75) Inventors: Xiao-Yi Zhang, Niederrohdorf (CH); Tobias Spitzmueller, Ennetbaden (CH); Stefano Bernero, Oberrohrdorf (CH)

(73) Assignee: ALSTOM Technology Ltd., Baden (CH)

( * ) Notice: Subject to any disclaimer, the term of this patent is extended or adjusted under 35 U.S.C. 154(b) by 934 days.

(21) Appl. No.: 12/430,314

(22) Filed: Apr. 27, 2009

(65) Prior Publication Data

US 2009/0229238 A1  Sep. 17, 2009

Related U.S. Application Data

(63) Continuation of application No. PCT/EP2007/060807, filed on Oct. 11, 2007.

(30) Foreign Application Priority Data

Nov. 1, 2006  (EP) ..................................... 06123306

(51) Int. Cl.
*F02C 9/28* (2006.01)
*F02C 9/26* (2006.01)
*F02C 9/00* (2006.01)

(52) U.S. Cl.
USPC ............................. 60/773; 60/39.281; 60/790

(58) Field of Classification Search ............... 60/39.281, 60/39.5, 725, 794, 39.37, 795, 772, 773
See application file for complete search history.

(56) References Cited

U.S. PATENT DOCUMENTS

| | | | |
|---|---|---|---|
| 5,321,947 A | 6/1994 | Sood et al. | |
| 6,595,002 B2 * | 7/2003 | Weisenstein | 60/772 |
| 6,742,341 B2 * | 6/2004 | Ryan et al. | 60/773 |
| 2007/0089395 A1 * | 4/2007 | Fujii et al. | 60/39.281 |

FOREIGN PATENT DOCUMENTS

| | | |
|---|---|---|
| EP | 0529900 | 3/1993 |
| EP | 1283339 | 2/2003 |

(Continued)

OTHER PUBLICATIONS

University of Michigan, Cascade Control, 2007, University of Michigan, pp. 1-29.*

(Continued)

*Primary Examiner* — Phutthiwat Wongwian
*Assistant Examiner* — Karthik Subramanian
(74) *Attorney, Agent, or Firm* — Cermak Nakajima LLP; Adam J. Cermak (57) ABSTRACT

A system for controlling NOx emissions and combustion pulsation levels of a gas turbine having a gas turbine combustion system, having a single combustion chamber and multiple burners, includes a cascade structure having a first and second control level (1, 2), the first level (1) having a device to control NOx emissions and generate combustion pulsation target levels based on the difference between measured and target NOx emission levels, and the second level (2) having a device to control pulsation levels and generate a ratio (γ) of fuel flow to different types of burners or to different stages of each burner. The fuel flow ratio (γ) is based on the difference between the measured and generated target pulsation levels. The control system enables the operation of a gas turbine to meet NOx emission requirements, while maintaining combustion pulsation levels within limits that ensure improved lifetime of the combustion system.

14 Claims, 8 Drawing Sheets

FOREIGN PATENT DOCUMENTS

| | | |
|---|---|---|
| EP | 1286031 | 2/2003 |
| EP | 1331448 | 7/2003 |
| EP | 1531243 | 5/2005 |
| EP | 1553343 | 7/2005 |
| EP | 1621811 | 2/2006 |
| WO | WO2005/093326 | 10/2005 |
| WO | WO2008/052867 | 5/2008 |

OTHER PUBLICATIONS

Search Report for European Patent App. No. 06123306.0 (Apr. 23, 2007).

International Search Report and Written Opinion of the International Searching Authority for PCT Patent App. No. PCT/EP2007/060807 (Dec. 28, 2007).

\* cited by examiner

SYSTEM FOR CONTROLLING A COMBUSTION PROCESS FOR A GAS TURBINE

This application is a Continuation of, and claims priority under 35 U.S.C. §120 to, International Application No. PCT/EP2007/060807, filed 11 Oct. 2007, and claims priority therethrough under 35 U.S.C. §§119, 365 to European Application No. 06123306.0, filed 1 Nov. 2006, the entireties of which are incorporated by reference herein.

BACKGROUND OF THE INVENTION

1. Field of the Invention

The invention relates to a system for controlling the combustion process for a gas turbine and, in particular, to a system for the active control of nitrogen oxide (NOx) emissions of the gas turbine and combustion pulsations. The system is particularly intended for gas turbine combustion systems having a plurality of pre-mix burners that lead to one single combustion chamber.

2. Brief Description of the Related Art

The NOx-emissions of combustions processes of gas turbines are subjected to environmental requirements that limit the levels of NOx emitted. In many countries, the limits for emissions levels are steadily lowered, presently to single-digit ppm-levels, and gas turbine manufacturers must be able to guarantee the required levels.

Gas turbines are required to operate at ever increasing efficiencies while producing lower levels of pollutants in their exhaust gases. Their efficiency can be increased, for example, by increasing the flame temperatures, however this also increases the levels of pollutants, in particular NOx, which is an exponential function of the flame temperature. One known method to control the NOx levels in a turbine's exhaust gas is to operate the burners with a maintained lean flame, i.e., at a lean fuel-to-air ratio, which lowers the flame temperature. However, a lean flame can lead to pulsations of the flame, or combustion pressure oscillations, which can reduce the lifetime of a burner. The formation of NOx and pulsations are influenced by several interconnected physical mechanisms such as the ambient atmospheric conditions, fuel composition, firing and flame temperature, combustion homogeneity, burner velocity, and others.

In essence, low NOx-emissions and pulsation levels, both of which need to be achieved in a gas turbine plant, are two counteracting physical processes. When a flame becomes leaner, then NOx-emissions decrease, however pulsations increase. Additionally, the more uniform the flame temperature resulting from multiple burners, the lower the NOx emissions and the greater the pulsations. Therefore, a trade-off between the two is necessary.

In gas turbine systems of the state of the art, pulsation and/or NOx level control is realized by various methods.

WO 2005/093326 discloses a gas turbine operating method for annularly arranged burners and combustion chambers that controls and reduces pressure pulsations by a system that individually actuates each burner and additionally monitors each burner using a sensor system.

U.S. Pat. No. 5,321,947 discloses a combustion system for a gas turbine engine having multiple swirler vanes arranged about a fuel injection nozzle. The combustion system is operated with a lean premix of fuel and with a cooled fuel injector in order to achieve reduced pollution. A low NOx level is maintained by a supply of combustible fuel into spaces between the swirler vanes, and combustion pressure oscillation are reduced by a continual supply of pilot fuel to the combustor at all operating conditions.

EP 1 621 811 discloses a method of operating a combustion system for a gas turbine engine having a plurality of burners. The fuel-to-air ratio for one or more burners is primarily controlled based on measured pressure oscillations or pulsations. In order to maintain the combustion close to the extinction limit, the fuel-to-air ratio is increased or decreased when pressure oscillations exceed a given lower or upper limit, respectively. Secondary to the control of pulsations, the fuel-to-air ratio is reduced when NOx levels are exceeded. In order to keep constant the total amount of fuel supplied to all the burners together, the fuel-to-air ratio for primary burners is increased while it is decreased for secondary burners.

EP 1 286 031 discloses a gas turbine control apparatus having a frequency analyzer of pressure oscillations in the combustion system and a control unit that controls, based on the result of the frequency analysis, the ratio of fuel and air supplied to the combustion chamber.

EP 1 331 448 discloses a fuel control system for a gas turbine engine having a plurality of burners and a plurality of combustion chambers, where each of the burners is associated with a separate, "can-type" combustion chamber. The system independently adjusts the fuel-to-air ratio of each individual combustion chamber to control the NOx level and dynamic pressure in each combustion chamber based on measurement of the NOx level in the exhaust, pressure oscillations in each combustion chamber, and fuel-to-air ratio variation among the burners. The adjustment is repeated until these variables are maintained within given ranges. The system is specifically designed for a gas turbine with multiple combustion chambers.

EP 1 283 339 discloses a method of remote monitoring of a gas turbine engine that operates at low NOX emissions. The method is intended to prevent damage due to resonances with turbine combustion oscillations and to provide low-cost communication of data to a remote monitoring center. It includes the measurement of oscillations data separated into frequency spectrum and peak value data. If abnormal peak values occur, then the frequency spectrum is observed. Before combustion oscillations develop to a critical level, where damage may occur, instructions are sent to operate the engine in a low-load operation mode. The monitoring is communicated by low-cost processes such as an ISDN-based line switching method.

EP 0 529 900 discloses a gas turbine apparatus having multiple burners and an annular combustion chamber and a controller to adjust the flow of fuel and/or air independently to each individual burner in view of controlling burner stability and NOx emissions. The individual adjustment is performed according to one or two sensed quantities relating to a combustion characteristic or performance quantity of each burner. Each quantity is measured separately, whereupon separate correction signals are determined for each. These are in turn added in order to generate a final control signal to a fuel and/or air valve.

SUMMARY

One of numerous aspects of the present invention includes a system for controlling the premix flame combustion process for a gas turbine comprising multiple burners, with all burners leading into one single combustion chamber. The system is to control the combustion process such that the NOx emissions of the gas turbine meet environmental requirements. Simultaneously, it is to control the combustion pulsations at a level as low as possible.

Another aspect includes an active system for controlling the combustion process for a gas turbine, in particular the emissions of nitrogen oxides (NOx) of the gas turbine and the combustion pulsation levels in the combustion chamber. The control system is applicable to a combustion system comprising multiple burners and one single combustion chamber, where all burners lead into this one combustion chamber. The multiple burners comprise main burner groups and supplementary burner groups, or each of the multiple burners comprises main stages and supplementary stages.

According to other aspects of the invention, the control system includes a two-level cascade structure including a first and second control level. A first control level of the system comprises means to control the NOx emissions in the exhaust of the turbine and generate and cascade to a second control level combustion pulsation target values. The second control level comprises means to control the combustion pulsations in the combustion chamber based on the target combustion pulsation levels provided by the first control level.

Specifically, the first control level, or NOx control level, receives NOx emissions measurement data and NOx target values, as given by the environmental requirements, and generates a combustion pulsation target value that is based on the difference between the target NOx emissions level and the measured NOx emissions level; the generated combustion pulsation target value is cascaded to the second control level of the control system. The second level is a combustion pulsation control level and adjusts a fuel flow distribution to the main and supplementary burner groups of the multiple burners or to the main and supplementary stages of each of the multiple burners in the gas turbine combustion system. The combustion system operated with said fuel flow distribution meets the combustion pulsation target as well as the NOx emission target given by the environmental requirements.

The fuel distribution among the burners is a distribution among main burner groups and supplementary burner groups or among main and supplementary stages. It is given by a fuel flow ratio defined by $$\gamma = m_{supp}/m_{total} = (m_{total} - m_{main})/m_{total}$$

where $m_{supp}$ is the mass flow to supplementary burner groups or supplementary burner stages, $m_{total}$ is the total fuel mass flow, $m_{main}$ is the mass flow to main burner groups or main burner stages.

A gas turbine combustion system, to which the cascade control system is applicable, includes main and supplementary burners arranged at the inlet to a single combustion chamber. The main and supplementary burners may be arranged in various ways. For example, the main and supplementary burners are arranged alternately along the circumference of the chamber inlet, or there can be a greater number of main burners compared to supplementary burners. In the mentioned cases, the main burners are, for example, operated with a richer fuel than the supplementary burners, which allows a more stable combustion process. The greater flame stability is, however, at the expense of increased NOx emissions due to burners operating with the greater fuel-to-air ratio.

A further gas turbine combustion system, to which the cascade control system is applicable, includes multiple burners leading into one single combustion chamber, where each burner is associated with different burner stages, for example, a premixing stage, and a pilot stage configured in the form of a lance. The two stages can also be any two different premixing stages.

As mentioned, the control system is applicable to a combustion system with multiple burners leading into one combustion chamber. The combustion system may include multiple burners and one combustion chamber, where all burners lead into that one combustion chamber. The combustion system may also include multiple burners and two combustion chambers arranged in sequence downstream from one another. Again, all burners lead into the one single, first combustion chamber.

The NOx control level includes means to receive two sets of input values, the target NOx emissions levels as determined by environmental or government requirements and the NOx emissions levels as measured in the exhaust of the gas turbine.

The NOx control level further includes means to calculate a pulsation target based on the difference between the measured and target NOx emissions levels. The pulsation target comprises one or more values of pulsation targets, where each of the one or more values is attributed to a predetermined pulsation frequency critical for the given gas turbine combustion system.

The pulsation control level comprises means to receive pulsation measurement data, including one or more pulsation levels measured in the gas turbine combustion system, a means to band-pass filter the pulsation measurement data, and means for measurement conditioning the band-pass filtered data. Measurement conditioning is a type of pre-processing the band-pass filtered data. It furthermore includes means for error processing, which determines the error between the measured pulsation levels and the calculated pulsation target values and further determines the error that is most relevant to the combustion system. Finally, the system includes means for calculating the supplementary fuel flow ratio $\gamma$ based on the error processing. The value of $\gamma$ is determined such that a NOx level target is fulfilled, while pulsations as low as possible are assured.

The cascade control system according to the invention is a closed-loop system. As the combustion system is operated at a calculated fuel flow ratio $\gamma$, the control system continuously receives measured pulsation and NOx levels and recalculates an optimum fuel flow ratio $\gamma$.

Pulsation levels in the combustion chamber can be measured more rapidly than NOx emissions in the exhaust of the turbine. For this reason, in an exemplary embodiment of the control system, the pulsation control level is adjusted to operate faster than the NOx emissions control level.

The control system according to the invention is particularly applicable to a combustion system with multiple burners arranged circumferentially about the gas turbine rotor axis and leading into an annularly shaped combustion chamber. It is further applicable to a combustion system comprising multiple burners arranged in an array radially adjacent to the gas turbine rotor. This type of combustion system is also referred to as side-mounted.

The cascade control system according to the invention achieves an improved and advantageous operation of a gas turbine combustion system in that it has a greater ability to meet the environmental requirements regarding NOx emissions. Additionally, as a result of the lowered pulsations levels of the combustion, the lifetime of the combustion system is increased.

DETAILED DESCRIPTION OF EXEMPLARY EMBODIMENTS

Figure 1:
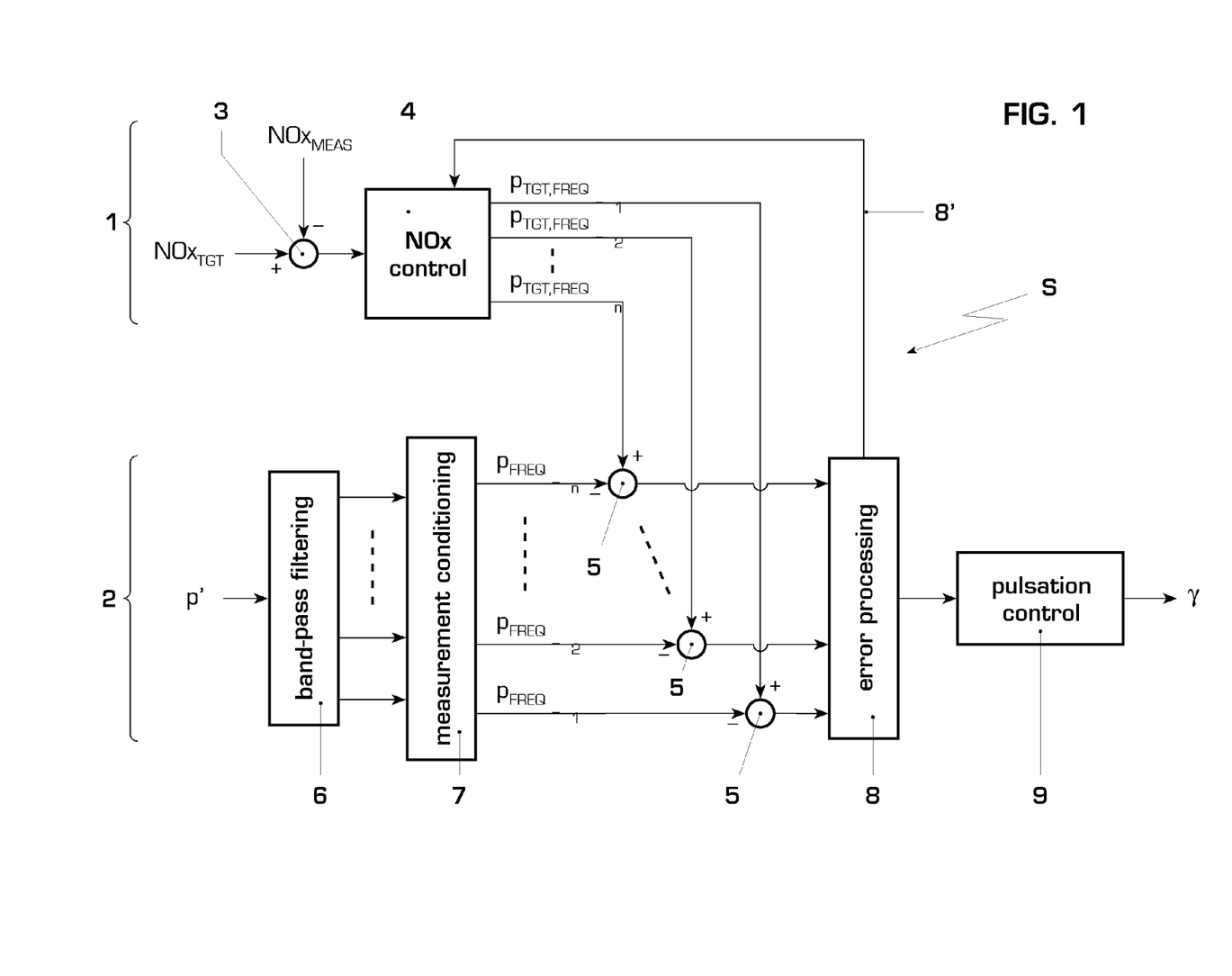
FIG. 1 shows a schematic of a two-level cascade control system according to the invention.

FIG. 1 schematically shows an exemplary cascade control system S according to the invention, and in particular the cascade structure having the first or NOx control level 1 and the second or pulsation control level 2.

The first control level 1 includes a device 3 for continuously receiving measurement data $NOx_{MEAS}$ of NOx emissions from the exhaust of the gas turbine and for NOx target levels $NOx_{TGT}$ as given, for example, by government regulations. A NOx control device 4 calculates, based on the difference between $NOx_{MEAS}$ and $NOx_{TGT}$, pulsation target values $p_{TGT,\ FREQ\_1}, p_{TGT,\ FREQ\_2}, \ldots p_{TGT,FREQ\_n}$, at selected frequencies FREQ_1, FREQ_2, ..., FREQ_n, which are critical for the given combustion system. These values are the lowest achievable pulsations levels corresponding to the NOx target level.

The calculated target pulsations values are cascaded to the second control level 2 of the control system S. They are input to a receiver 5 for the target pulsations levels $p_{TGT,\ FREQ\_1}$, $p_{TGT,\ FREQ\_2}, \ldots p_{TGT,\ FREQ\_n}$. The second control level 2 further includes a device 6 for continuously receiving and band-pass filtering raw measured values p' of pulsations and a device 7 for measurement conditioning the band-pass filtered measurement data. The measurement-conditioned data of pulsations $p_{FREQ\_1}, p_{FREQ\_2}, \ldots P_{FREQ\_n}$, which is at the same critical frequencies as the target pulsation values, is also input to the receiver 5.

The receiver 5 is connected to an error processing device 8, which determines the error between measured and target pulsation level, which is most critical and relevant to the given combustion system. This critical error is at one of the critical frequencies. The pulsation control level 2 further includes a device for pulsation control 9, which calculates a fuel flow ratio γ based on the selected critical error. The calculated fuel flow ratio γ assures pulsations as close as possible to the target pulsation level.

In a further exemplary embodiment of the control system S, a control signal line 8' leads from the error processing device 8 to the NOx control device 4. The error processing device 8 sends information about a selected critical frequency to the NOx control device 4, at which the worst or the most relevant error between target and measured pulsation levels has been detected. It further instructs the NOx control device 4 to adjust the pulsation target level at that selected frequency and keep the target pulsation levels at the other critical frequencies unaltered.

Figure 2:
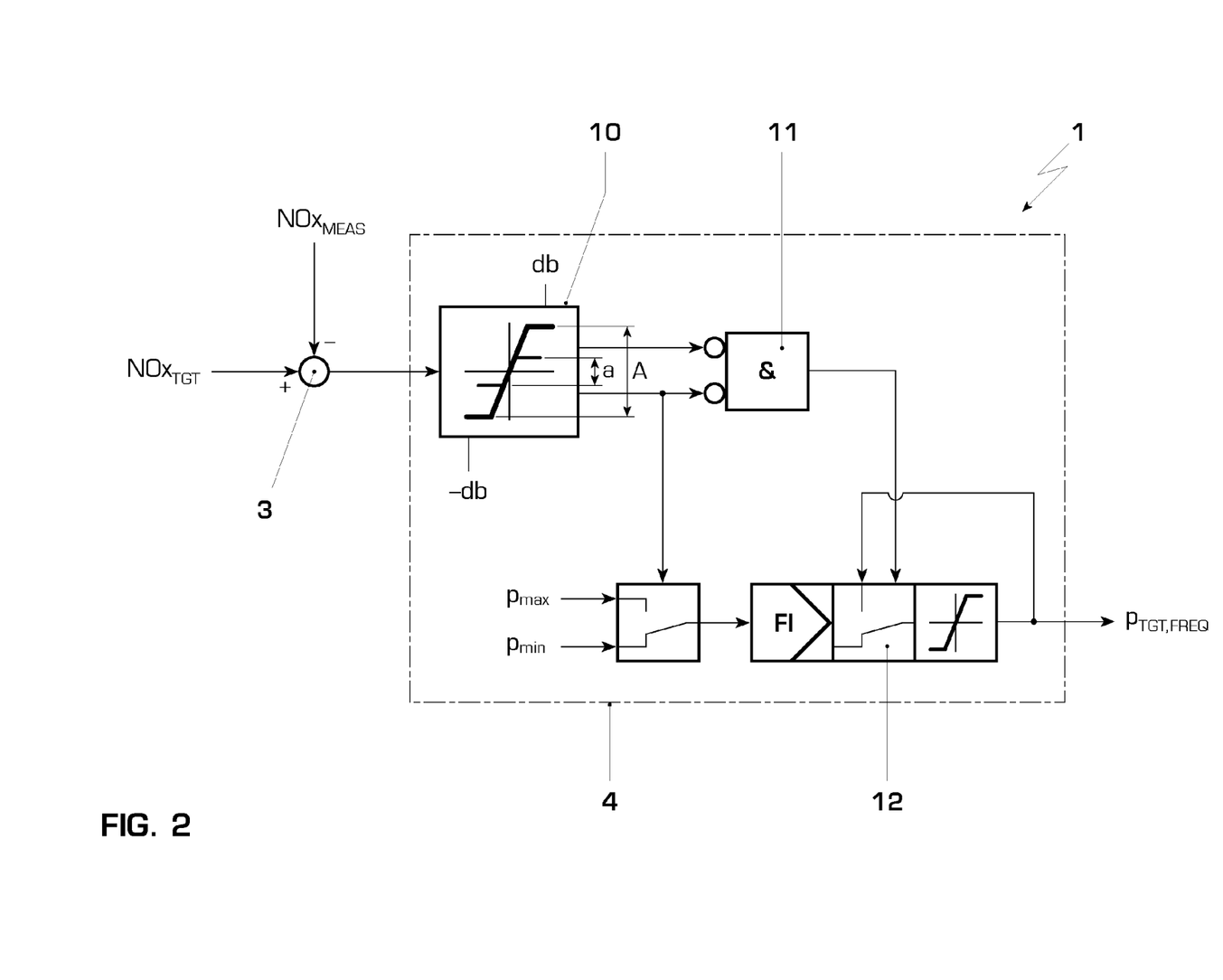
FIGS. 2 and 3 show a schematic of an exemplary embodiment of the first and second control level, respectively, FIGS. 4a and b each show the qualitative relationship between the fuel flow ratio and NOx emissions and pulsation levels, where FIG. 4b additionally shows an example of a targeted NOx emission and pulsation level.

FIG. 2 shows in detail the elements of the first control level 1 of the cascade control system, in particular those of the device 4 for calculating the target pulsations. While the element 4, as shown in FIG. 1, provides calculation of the target pulsations at several given critical frequencies, the FIG. 2 illustrates the calculation of the target pulsation level at one critical frequency FREQ. The control system S is applicable to combustion systems having one or several critical pulsation frequencies.

The measured NOx level $NOx_{MEAS}$ and the target NOx level $NOx_{TGT}$ according to regulations are input with opposite signs to device 3, which calculates the difference between the two values. The difference is compared to a predetermined NOx emissions range of insensitivity, or dead band A, by a limiter 10. The output from the limiter 10 is then input to a logical AND-gate 11.

The predetermined NOx emissions dead band A is derived from the environmental regulations and/or the accuracy of the control that needs to be achieved.

If the difference lies within this dead band A, then a target pulsation level $p_{TGT}$ may remain the same. If however, the measured NOx level $NOx_{MEAS}$ is higher than the target NOx level $NOX_{TGT}$ and the difference is outside the predetermined dead band A, then the pulsation target $p_{TGT}$ is increased. At this point the dead band is reduced to a smaller range of insensitivity of size "a" until the difference between measured and target NOx levels are within this small dead band "a". Once the difference is within the small dead band "a", the dead band is again increased back to the original dead band A.

Conversely, if the measured NOx level $NOx_{MEAS}$ is lower than the target NOx level $NOX_{TGT}$ and the difference is outside the predetermined dead band A, then the pulsation target $p_{TGT}$ is decreased. Analogous to the case above, the dead band is reduced to a smaller range "a" until the difference between measured and target NOx levels are within this small dead band "a". Once the difference is again within the small dead band "a", the dead band is increased back to the original size A.

$p_{max}$ and $p_{min}$ are maximum and minimum target pulsation levels considered acceptable for the given gas turbine combustion system. Such maximum and minimum pulsation levels are predetermined for each critical frequency for a given gas turbine combustion system. The FI-block 12 is a follow-up integrator for the calculation of a new target pulsation level, either increased or decreased, where the new target pulsation level will be between the limits of $p_{max}$ and $p_{min}$.

Figure 3:
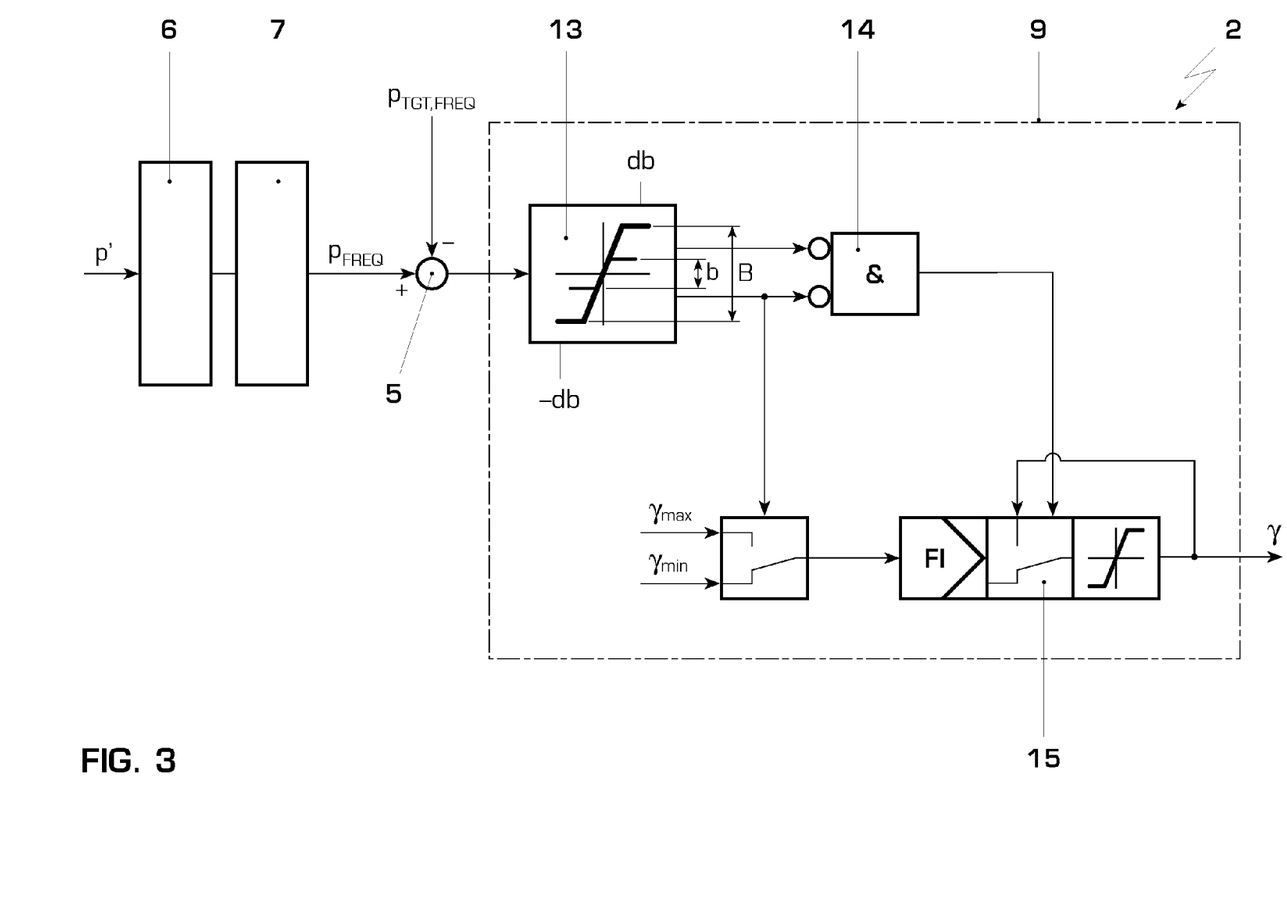

FIG. 3 shows an exemplary embodiment of the second control level 2, the pulsation control level. This level includes a band-pass filter 6, to which the measured pulsation levels p' are input in order to select pulsation data within a predetermined frequency band that is significant for a given gas turbine combustion system. The filtered data is then pre-processed, also called measurement conditioned, by the device 7. The filtered and measurement conditioned data is then input with a negative sign to receiver 5 together with the target pulsation values calculated by control level 1 and having a positive sign. Receiver 5 calculates the difference between the target pulsation levels and the measured and conditioned pulsation levels. The difference is compared to a predetermined pulsation levels dead band B by limiter 13. The output of limiter 13 is then input to a logical AND-gate 14.

If the difference is within the given dead band B, then the fuel flow ratio γ is held constant. If the measured pulsation level is higher than the target pulsation level and the difference is outside the dead band B, then the fuel flow ratio γ is increased. At this point, the dead band is reduced to a small band "b" until the error is within this reduced dead band "b". Once the error falls within this dead band "b", the dead band is again increased to B.

Conversely, if the measured pulsation level is lower than the target and the difference is outside the dead band B, then the fuel flow ratio γ is decreased. The dead band is decreased to "b" until the error is within the reduced dead band "b". Once the error falls within the dead band "b", the dead band is again increased to B.

The FI-block 15 calculates a fuel flow ratio that is within limits of maximum and minimum fuel flow ratio values $\gamma_{MAX}$ and $\gamma_{MIN}$ as predetermined for the given gas turbine combustion system.

In the example shown in FIG. 3, only one critical frequency is present and subsequently the difference between measured and target pulsation levels is determined at that one critical frequency. Alternately, in a system having several critical frequencies, error processing devices (such as indicated by element 8 in FIG. 1) are included following the receiver 5. The error processing device performs a weighted error selection and determines the error between measured and target pulsation levels that is most relevant. This frequency, at which this error occurs, is then passed to the NOx control device 4 via control signal line 8'. The error selected by the error processing device 8 is input to the limiter 13 of the pulsation control device 9.

Element 7 as shown in FIG. 3 is a device for pre-processing (measurement conditioning) the raw, band-pass filtered combustion pulsation data. The raw data p' cannot be used effectively as a feedback signal in a closed loop system such as the control system according to the invention because the raw data fluctuates too strongly. If unprocessed data were used, then fuel flow ratios would result that are based on extreme values that are not representative of the combustion process as a whole. The pre-processing conditioning provides a filtering of non-representative data fluctuations, where, however, the primary nature of the data is maintained.

Figure 4A:
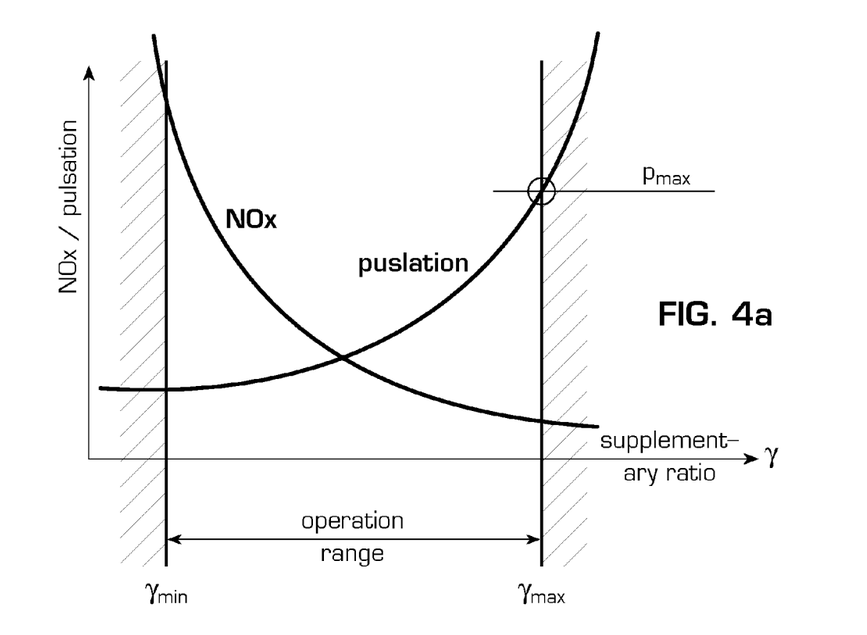
Figure 4B:
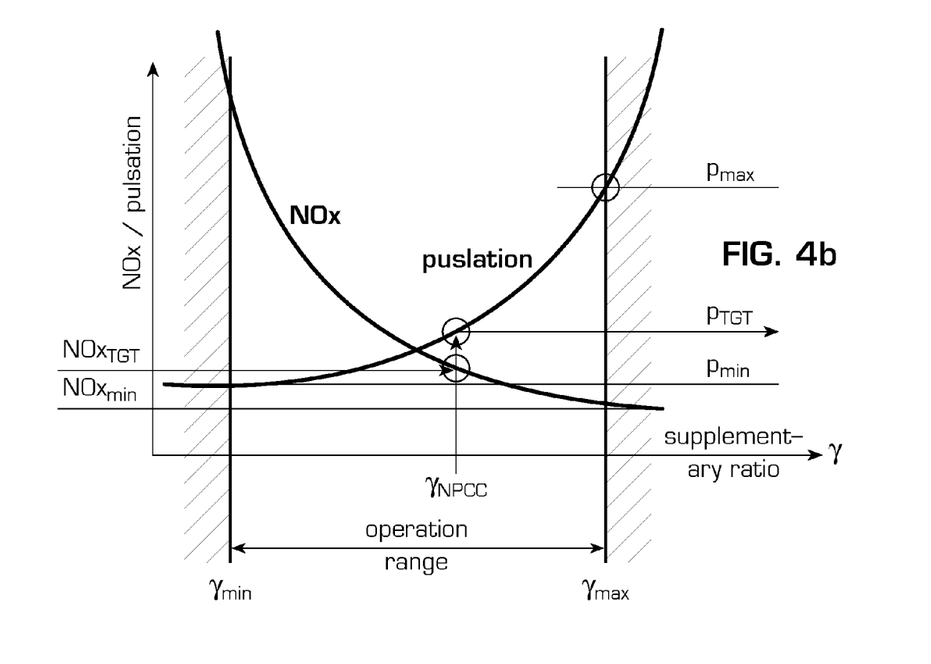

FIGS. 4a and b provide a further understanding of a control system according to the invention and in particular the trade-off between the NOx emissions and the combustion pulsation levels achievable by the cascade control system.

FIG. 4a shows the principle of operation for a given gas turbine, the curve showing NOx emissions and combustion pulsations for a pre-mixed flame as a function of the supplementary or fuel flow ratio γ. With increasing ratio γ, the NOx emissions gradually decrease, while the pulsation levels gradually increase. A lean pulsation limit $p_{max}$ is indicated for a given combustor.

FIG. 4b shows the same principle as in 4a, however, with NOx levels and pulsation levels as controlled by the cascade control system. A gas turbine can initially be operated close to the lean pulsation limit $p_{max}$ in order to reduce NOx emissions to a minimum at $NOx_{MIN}$. These minimum NOx emissions $NOx_{MIN}$ are, however, below the limit $NOx_{TGT}$ given by regulations and the pulsations levels are high at $p_{MAX}$ such that the gas turbine may suffer shortened lifetime due to the pulsations. If the gas turbine is now controlled by a cascade control system according to the invention, the gas turbine combustion system can be operated with reduced pulsation levels and NOx emission levels that still meet the NOx emissions requirements. Based on the difference between measured and required NOx levels, a pulsation target $p_{TGT}$ is generated by the NOx control level or first level of the control system. In this case, the measured NOx emission is lower than the required NOx level $NOx_{TGT}$, and the difference is outside a given dead band. Therefore the pulsation target is decreased from $p_{max}$ to $p_{TGT}$. Each target pulsation level corresponds to the levels as adjusted by the NOx control level. The gas turbine combustion system will now, for example, be operated at the fuel flow ratio $\gamma_{NPCC}$ as calculated by the NOx and pulsation cascade control system. While the combustion system is operated at this fuel flow ratio $\gamma_{NPCC}$, the control loop is closed by the input of new NOx emission and pulsation level measurement data to the control system, whereupon the fuel flow ratio is again adjusted.

A NOx emission measurement can take, for example, about 20 seconds where the pulsation level measurement takes only approximately 1 second. The adjustment of the fuel flow ratio γ is preferably adjusted within a time frame of a few seconds.

Figure 5:
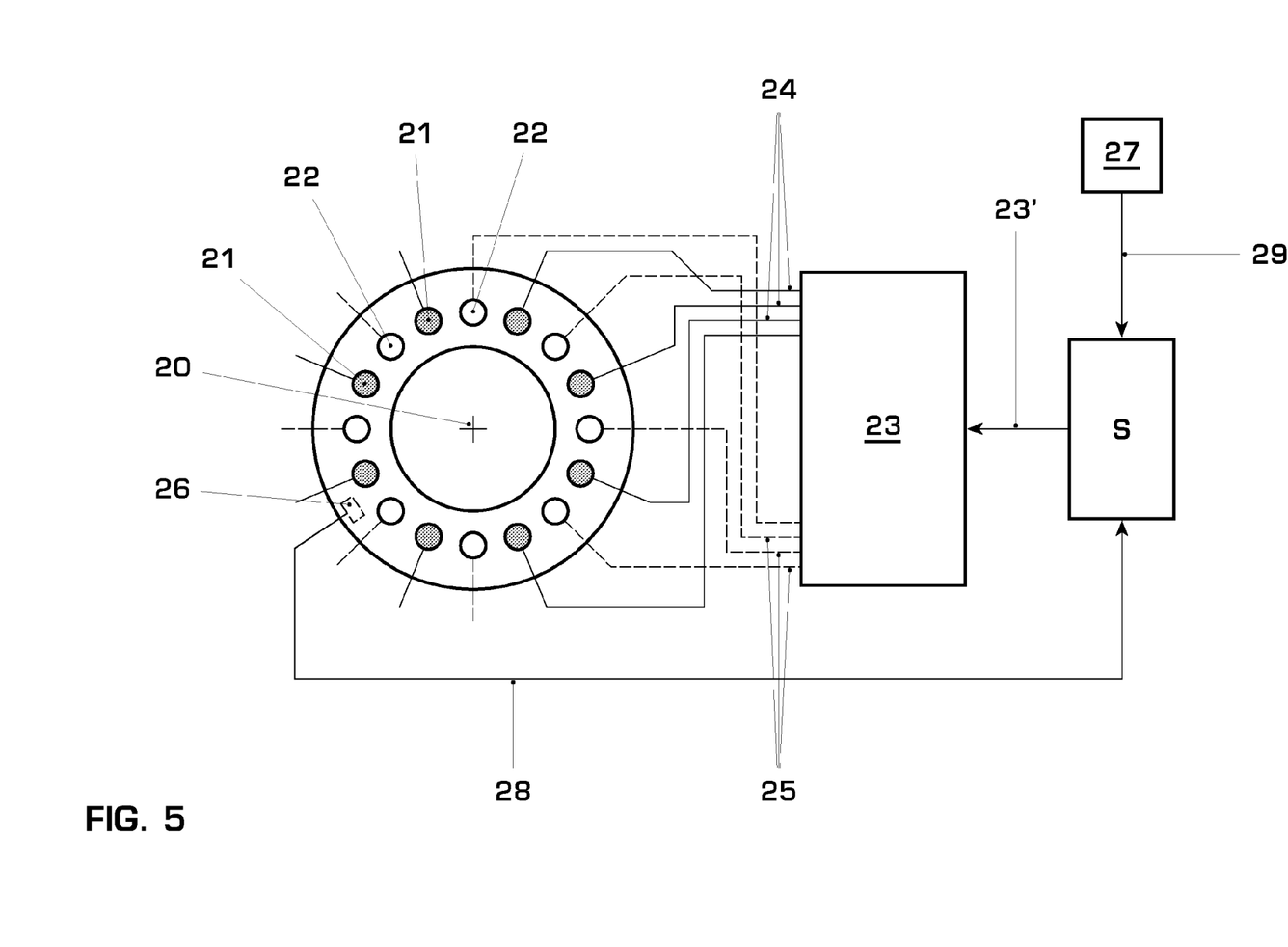
FIG. 5 shows a gas turbine combustion system, to which a control system according to the invention may be applied, the combustion system having a single ring-shaped combustion chamber, and an exemplary arrangement of main and supplementary burner groups positioned circumferentially about the gas turbine rotary axis.

FIG. 5 shows a cross-section of gas turbine combustion system, to which the cascade control system is applicable. The cross-section is perpendicular to the turbine rotary axis 20 of a gas turbine and at the level of pre-mixing burners 21, 22. The pre-mixing burners include main burners 21 (darkened circles) and supplementary burners 22 (empty circles), which are arranged circumferentially about the turbine rotary axis 20. The burners extend into a ring-shaped combustion chamber that follows the burners in a direction out of the page. The main burners 21 and supplementary burners 22 are in this case arranged alternately about the circumference. They may be arranged also in any other way along the circumference.

The main burners, for example, operate with a richer fuel-to-air ratio and further away from the extinguishing limit than the supplementary burners. All burners are supplied with fuel by a fuel supply and distribution system 23 and via main fuel lines 24 (full lines) and supplementary fuel lines 25 (broken lines). The figure is to be understood that fuel lines lead to all burners shown. However, for the sake of simplicity of the figure, only some of the fuel lines are illustrated completely, while the other fuel lines are partially indicated by either full lines or dotted lines extending radially away from the burners 21 and 22, respectively. The distribution of the fuel to the main and supplementary burners is controlled by the fuel distribution system 23. A control signal line 23' for the fuel flow ratio γ leads from the cascade control system S to the fuel supply and distribution system 23. A pulsation level sensor 26 placed within the combustion chamber and a NOx emissions sensor 27 placed in the exhaust gas are each connected by a signal line 28 and 29, respectively, to the cascade control system S for inputting pulsation and emissions measurement data to the control system.

Figure 6:
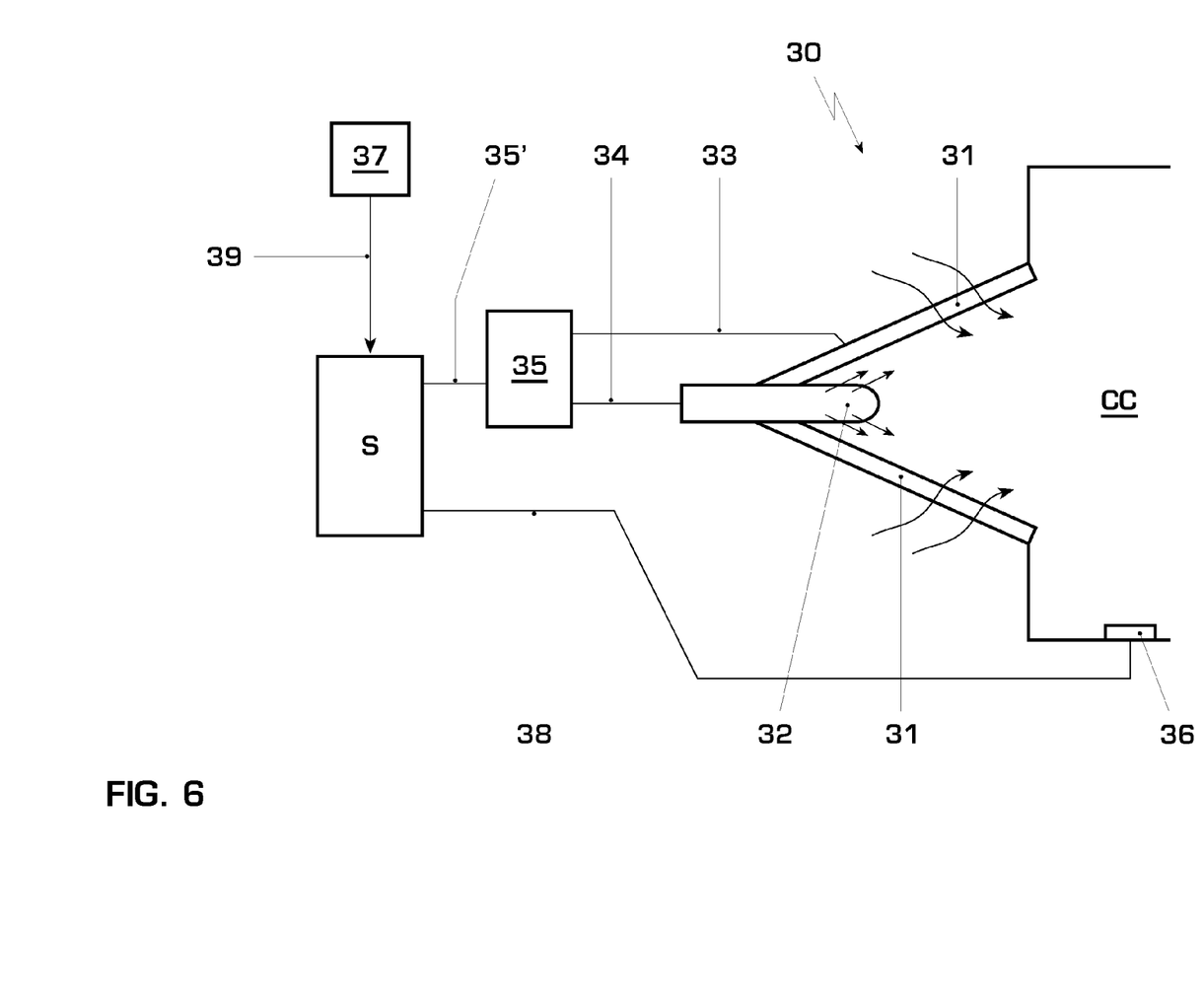
FIG. 6 shows a longitudinal cross-section of one of several burners of a further gas turbine combustion system, to which a control system according to the invention may be applied, the burner having a main and supplementary stage.

FIG. 6 shows a burner of a further gas turbine combustion system to which the cascade control system may be applied. The combustion system includes, similar to that of FIG. 5, multiple premixing burners arranged circumferentially about the rotary axis of a gas turbine, where each burner extends to the inlet of a ring-shaped combustion chamber C. In this case, each burner has a cone shape and has a main and supplementary stage. The cross-section along the longitudinal axis of the burner 30, as shown in FIG. 6, shows the two different stages, a main stage 31 arranged on the cone-shaped surface of the burner and a supplementary stage 32 arranged on a fuel lance and extending along the longitudinal axis of the cone-shaped burner. The flames generated by the two different stages give rise to different amounts of NOx emissions and different amounts of pulsations. Fuel lines 33 and 34 lead from a fuel supply and distribution system 35 to the main and supplementary burners 31 and 32, respectively. The fuel from line 33 flows to openings arranged along the cone-shaped burner wall. The distribution of the fuel is controlled by the cascade control system S, which sends a control signal for the fuel flow ratio γ to the supply system 35 via signal line 35'. A combustion pulsation level sensor 36 placed within the combustion chamber CC and NOx emissions sensor 37 placed in the exhaust of the gas turbine are connected to the cascade control system S by signal transmission lines 38 and 39, respectively, which send pulsation and emissions measurement data to the control system S.

Figure 7:
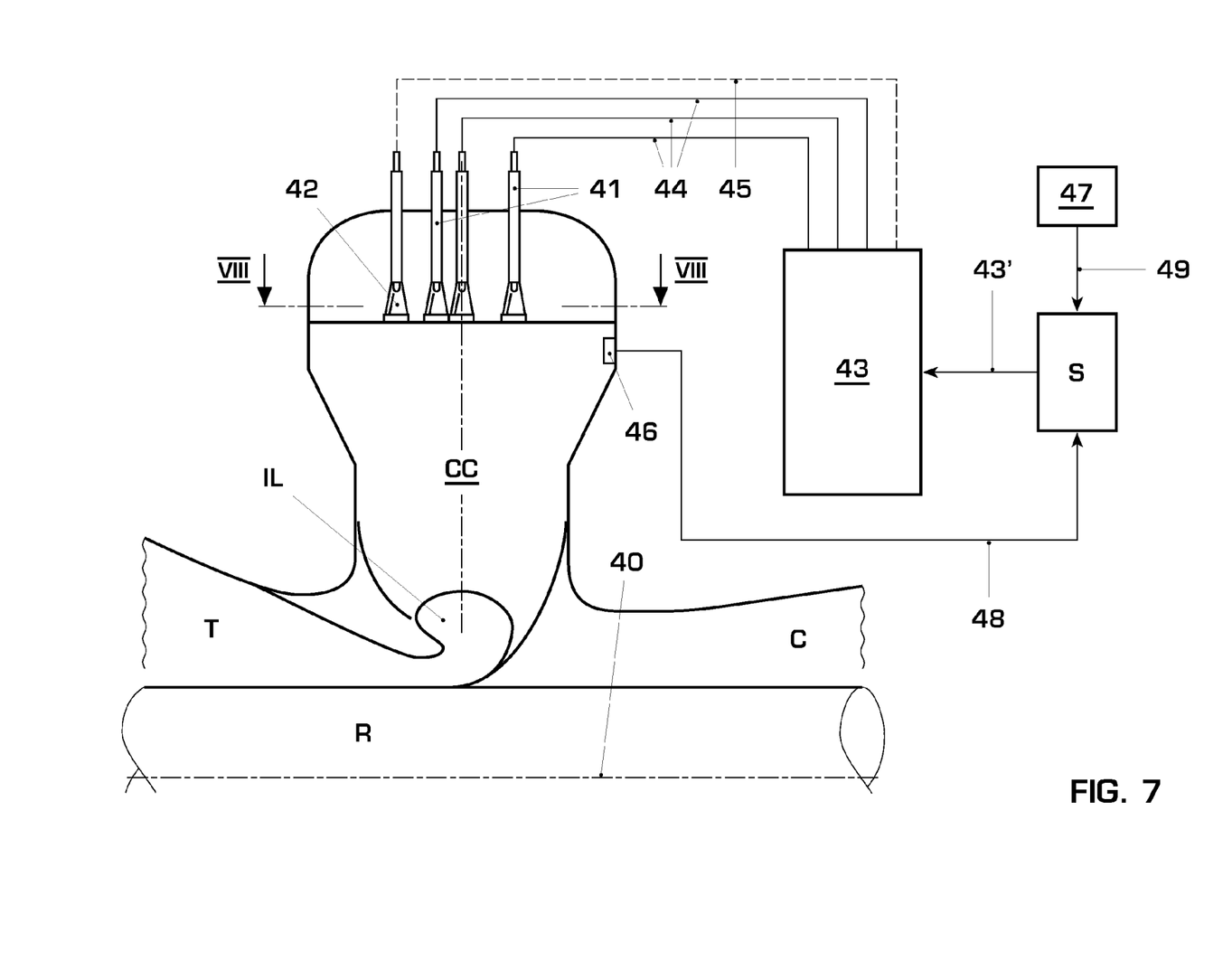
FIG. 7 shows a further gas turbine combustion system, to which a control system according to the invention may be applied, the combustion system having an array of burners arranged radially adjacent to the rotor of the gas turbine.
Figure 8:
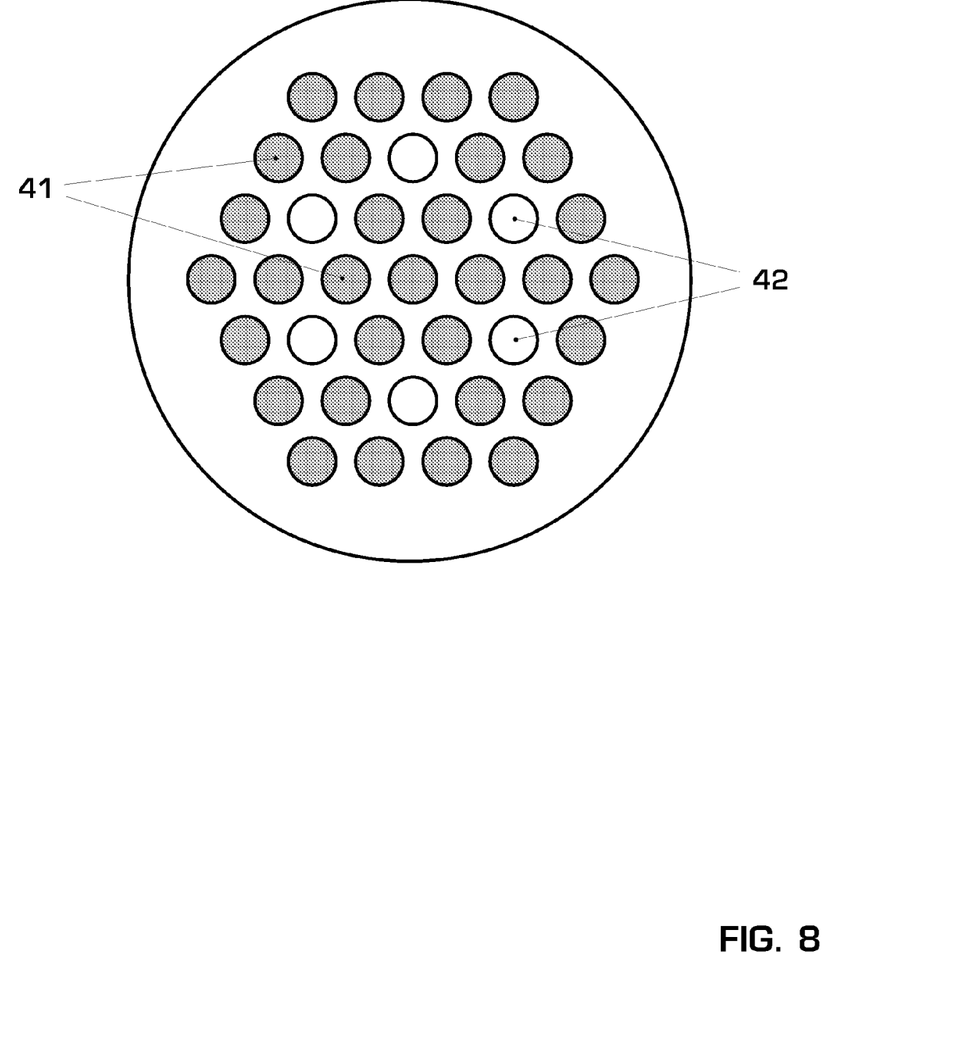
FIG. 8 shows a cross-section of the combustion system perpendicular to its longitudinal axis, taken at the line VIII-VIII in FIG. 7.

FIGS. 7 and 8 show a further exemplary combustion system for a gas turbine, to which the control system according to the invention may be applied. The figure shows a compressor C and a turbine T arranged on a rotor R with rotary axis 40. A combustion system includes multiple burners 41 and 42, which lead into one single combustion chamber CC. The combustion chamber CC is approximately in the shape of a silo and arranged in side mounted manner, adjacent to the turbine. In the example shown, the longitudinal axis of the silo is along the radial direction with respect to the rotary axis 40 of the gas turbine. An annular inlet channel IL extends from the combustion chamber CC to the turbine T. All burners are supplied with fuel by a fuel supply and distribution system 43 and via main fuel lines 44 (full lines) and supplementary fuel lines 45 (broken lines). The distribution of the fuel to the main and supplementary burners is controlled by the cascade control system S, from which a control signal line 43' for the fuel flow ratio γ leads to the fuel supply and distribution system 43. A pulsation level sensor 46 is placed within the combustion chamber CC, and a NOx emissions sensor 47 is positioned at a location in the exhaust gas suitable for reliable NOx measurements. Pulsation and emission measurement data are input to the cascade control system S by signal line 48 and 49, respectively.

FIG. 8 shows in cross-section an exemplary arrangement of the main burners 41 and supplementary burners 42 in the combustion system of FIG. 7. They are all arranged in a planar array. In an exemplary operation of the combustion system, the main burners are supplied with a richer fuel-to-air ratio, while the supplementary burners are supplied with a leaner fuel.

TERMS USED IN CONNECTION WITH THE FIGURES

S cascade control system
1 first level of cascade control system, NOx emissions control level
2 second level of cascade control system, pulsation control level
3 input device
4 NOx control device
5 input receiver device
6 band-pass filter
7 measurement conditioning device
8 error processing device
9 pulsation control device
10 limiter
11 logical AND-gate
12 FI-block
13 limiter
14 logical AND-gate
15 FI-block
20 rotary axis of gas turbine
21 main burners
22 supplementary burners
23 fuel distribution system
23' control signal line
24 main fuel line
25 supplementary fuel line
26 pulsation sensor
27 NOx emissions sensor
28 signal line
29 signal line
30 burner with main and supplementary stages
31 main stage of burner 30
32 supplementary stage of burner 30
33 fuel line
34 fuel line
35 fuel supply system
35' control signal line
36 pulsation sensor
37 NOx emissions sensor
38 signal line
39 signal line
CC combustion chamber
R rotor
T turbine
C compressor
IL annular inlet channel
40 rotary axis
41 main burners
42 supplementary burners
43 fuel distribution system
43' control signal line
44 fuel supply line
45 fuel supply line
46 pulsation level sensor
47 NOx sensor
48 signal line
49 signal line While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

We claim:

1. A system for controlling the combustion process of a gas turbine, the gas turbine having a gas turbine combustion system with multiple burners, the multiple burners extending into a single combustion chamber, the multiple burners having either main burners and supplementary burners, or main burner stages and supplementary burner stages, the system comprising:

a cascade structure comprising primary and secondary cascade control loops, wherein the primary cascade control loop comprises means for controlling nitrogen oxide emission levels in the exhaust of the gas turbine and generating and cascading to the secondary cascade control loop pulsation target values ($p_{TGT,\ FREQ-i}$), and wherein the secondary cascade control loop comprises means for controlling the combustion pulsation level.

2. A system according to claim 1, wherein:
the primary cascade control loop comprises means for determining the difference between measured NOx emission levels ($NOx_{MEAS}$) from the gas turbine and target NOx emission levels ($NOx_{TGT}$), and means for generating pulsation target levels at least one predetermined critical frequency ($p_{TGT,\ FREQ-i}$) based on said difference between NOx emission levels ($NOx_{MEAS}$, $NOx_{TGT}$); and
the secondary cascade control loop comprises means for determining the difference between measured pulsation data (p') from the gas turbine combustion system and the target pulsation levels ($p_{TGT,\ FREQ-i}$) generated by the primary cascade control loop, and means for generating a fuel flow ratio (γ) of fuel flow to the main and supplementary burners or to the main and supplementary burner stages, said ratio defined by $$\gamma = m_{supp}/m_{total} = (m_{total} - m_{main})/m_{total},$$

where
$m_{supp}$ is the mass flow to supplementary burner groups or supplementary burner stages,
$m_{total}$ is the total fuel mass flow,
$m_{main}$ is the mass flow to main burner groups or main burner stages, and the value of the fuel flow ratio (γ) is based on said difference between measured and target pulsation levels (p', $p_{TGT,\ FREQ-i}$).

3. A system according to claim 2, wherein:
the primary cascade control loop comprises means for continuously receiving measured NOx emission levels ($NOx_{MEAS}$) and target NOx emission levels ($NOx_{TGT}$), and determining the difference between said measured and target NOx emission levels ($NOx_{MEAS}$, $NOx_{TGT}$); and
the secondary cascade control loop comprises means for continuously receiving and band-pass filtering the measured pulsation levels (p').

4. A system according to claim 3, wherein the secondary cascade control loop comprises means for pre-processing the band-pass filtered pulsation level data.

5. A system according to claim 3, wherein the primary cascade control loop comprises:
a limiter configured and arranged to compare the difference between the measured and target NOx emission levels ($NOx_{MEAS}$, $NOx_{TGT}$) to a predetermined NOx emissions dead band; and
a follow-up integrator configured and arranged to determine the target pulsation levels at one or more critical frequencies ($p_{TGT,\ FREQ-i}$) based on said comparison of the difference of NOx emissions to the predetermined NOx emissions dead band.

6. A system according to claim 5, wherein the follow-up integrator is configured and arranged to generate target pulsation levels ($p_{TGT,FREQ-i}$) that are between a predetermined maximum and minimum target pulsation level ($p_{max}$, $p_{min}$).

7. A system according to claim 3, wherein the secondary cascade control loop comprises:
means for determining the minimum difference between a pre-processed pulsation level ($p_{FREQ}$) at a critical frequency and the target pulsation levels ($p_{TGT,\ FREQ}$) at said frequency;

a limiter configured and arranged to compare said difference to a predetermined pulsation levels dead band; and
a follow-up integrator to generate the fuel flow ratio (γ).

8. A system according to claim 4, wherein the secondary cascade control loop comprises:
means for determining the difference between pre-processed pulsation levels ($p_{FREQ-i}$) at several critical frequencies and the target pulsation levels ($p_{TGT,\ FREQ-i}$) at said critical frequencies;
error processing means for selecting from the several critical frequencies the critical frequency at which the most relevant error occurs;
a limiter for comparing said difference at said selected frequency to a predetermined pulsation levels dead band; and
a follow-up integrator to generate the fuel flow ratio (γ).

9. A system according to claim 5, wherein the secondary cascade control loop comprises:
means for determining the difference between pre-processed pulsation levels ($p_{FREQ-i}$) at several critical frequencies and the target pulsation levels ($p_{TGT,\ FREQ-i}$) at said critical frequencies;
error processing means for selecting from the several critical frequencies the critical frequency at which the most relevant error occurs;
a limiter for comparing said difference at said selected frequency to a predetermined pulsation levels dead band; and
a follow-up integrator to generate the fuel flow ratio (γ).

10. A system according to claim 7, wherein the follow-up integrator is further configured and arranged to generate a fuel flow ratio (γ) that is between a predetermined maximum and minimum fuel flow ratio ($\gamma_{max}$, $\gamma_{min}$).

11. A system according to claim 1, wherein the secondary cascade control loop operates at a faster speed than the primary cascade control loop.

12. A system according to claim 8, further comprising:
a control signal line leading from the error processing means to the NOx control means for passing information about the selected critical frequency at which the most relevant error occurs to the NOx control means, and instructing the NOx control means to adjust the target pulsation level at the selected critical frequency and leaving unaltered the pulsation levels at the other critical frequencies.

13. A method for controlling the combustion process of a gas turbine, the gas turbine having a gas turbine combustion system with multiple burners, the multiple burners extending into a single combustion chamber, the multiple burners having either main burners and supplementary burners, or main burner stages and supplementary burner stages, the method comprising:
controlling nitrogen oxide emission levels in the exhaust of the gas turbine in a primary cascade control loop of a control structure;
generating and cascading, to a secondary cascade control loop of said control structure, pulsation target values ($p_{TGT,\ FREQ-i}$); and
controlling the combustion pulsation level in said secondary cascade control loop.

14. A method according to claim 13, wherein the control structure comprises a cascade structure comprising said primary and secondary cascade control loops.

* * * * *